US009100329B1

(12) United States Patent
Jiang et al.

(10) Patent No.: US 9,100,329 B1
(45) Date of Patent: Aug. 4, 2015

(54) PROVIDING NON-INTERRUPT FAILOVER USING A LINK AGGREGATION MECHANISM

(75) Inventors: Dongyi Jiang, San Jose, CA (US); Jin Shang, Saratoga, CA (US); David Yu, San Jose, CA (US); Tsai-Zong Lin, Cupertino, CA (US); Chih-Wei Chao, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 194 days.

(21) Appl. No.: 13/536,419

(22) Filed: Jun. 28, 2012

(51) Int. Cl.
*H04L 12/26* (2006.01)
*H04L 12/707* (2013.01)
*H04L 12/703* (2013.01)

(52) U.S. Cl.
CPC ............... *H04L 45/28* (2013.01); *H04L 45/22* (2013.01)

(58) Field of Classification Search
CPC ..... H04L 47/10–47/18; H04L 47/323–47/326; G06F 11/08–11/20; H04Q 2011/0081–2011/0083; H04Q 2213/13163–2213/13167; H04Q 3/54558
USPC .................. 370/216–228, 242–245, 248–251
See application file for complete search history.

(56) References Cited

U.S. PATENT DOCUMENTS

| | | | | |
|---|---|---|---|---|
| 7,639,604 | B2* | 12/2009 | Wakai et al. | 370/218 |
| 8,089,965 | B2* | 1/2012 | Mitsumori | 370/390 |
| 2005/0094553 | A1* | 5/2005 | Zhou et al. | 370/217 |
| 2005/0195807 | A1* | 9/2005 | Rao et al. | 370/386 |
| 2008/0037418 | A1* | 2/2008 | Cole et al. | 370/220 |
| 2008/0225699 | A1* | 9/2008 | Lee | 370/218 |
| 2008/0259786 | A1* | 10/2008 | Gonda | 370/218 |
| 2010/0034081 | A1* | 2/2010 | Yoshimura | 370/228 |
| 2010/0271933 | A1* | 10/2010 | Li et al. | 370/219 |
| 2012/0033678 | A1* | 2/2012 | Page et al. | 370/401 |
| 2013/0016606 | A1* | 1/2013 | Cirkovic et al. | 370/225 |
| 2013/0084063 | A1* | 4/2013 | Hu et al. | 398/2 |
| 2013/0155846 | A1* | 6/2013 | Ramachandran et al. | 370/225 |

OTHER PUBLICATIONS

"IEEE Standard for Local and metropolitan area networks—Link Aggregation", IEEE Computer Society, IEEE Std 802.1AX™, Nov. 3, 2008, 163 pages.
"Link aggregation" From Wikipedia, the free encyclopedia, retrieved online at: http://en.wikipedia.org/wiki/Link_Aggregation_Control_Protocol, print date Jun. 28, 2012, 8 pages.

* cited by examiner

*Primary Examiner* — Thai Hoang
(74) *Attorney, Agent, or Firm* — Harrity & Harrity, LLP (57) ABSTRACT

A device receives traffic; identifies an address associated with the traffic; determines whether the address is associated with an aggregate interface, the aggregate interface being associated with a first port and a second port. The first port corresponds to a first node in a first state, that indicates that the first node is available to forward the traffic, and the second port corresponds to a second node in a second state, that indicates that that the second node is not available to forward the traffic. The device transmits the traffic to the first node via the first port and to the second node, via the second port, when the address is associated with the aggregate interface. Transmitting the traffic enables the second node to forward the traffic when the first node changes from the first state to the second state.

21 Claims, 8 Drawing Sheets

| SWITCH ID 505 | AGGREGATE INTERFACE 510 | ADDRESS 515 | LINK ID 520 | LINK STATE 525 | NODE ID 530 | NODE STATE 535 |
|---|---|---|---|---|---|---|
| 210-1 | 235-1 / 225-1 / Port 1 | ADD1 | 230-1 | ATTACHED | 220-1 | BACKUP |
| 210-1 | 235-1 / 225-2 / Port 2 | ADD1 | 230-2 | COLLECTING / DISTRIBUTING | 220-2 | ACTIVE |

Fig. 5

PROVIDING NON-INTERRUPT FAILOVER USING A LINK AGGREGATION MECHANISM

BACKGROUND

Computing and communication networks typically include nodes, such as routers, firewalls, switches, or gateways, which transfer or switch data, such as packets, from one or more sources to one or more destinations. The nodes may operate on the packets as the packets traverse the network, such as by forwarding or filtering packet-based network traffic.

Nodes may be configured in a node cluster to provide high availability (HA) security services, to a network, through redundancy when one of the nodes and/or links, within the cluster, fails. When a failure is detected within an active node and/or link, within the cluster and via which traffic is being transported, a failover operation may be performed to preserve traffic flow via the cluster. The failover operation may, for example, be performed by switching the active node and/or link from an active state to an inactive state and/or by switching a backup node and/or link from the inactive state to the active state. The backup node and/or link may be switched to the active state so that the traffic may be transported to and/or from the backup node via the backup link.

Unfortunately, performing the failover operation may cause a temporary, though significant, disruption (e.g., 10 seconds, 30 seconds, 1 minute, 5 minutes, 10 minutes, etc.) to traffic flow via the cluster. For example, when performing the failover operation, the active node may toggle the active link (e.g., from an active state, to an inactive state, and back to an active state), which may cause an address table (e.g., that stores a list of media access control (MAC) addresses and/or other addresses), used by a switch within the cluster, to be purged. The switch may, as a result of purging the address table, replicate and flood packets to some or all ports associated with the switch (e.g., including ports associated with the backup node) to rebuild the address table based on an address associated with the backup node. The flooded packets may also notify other nodes, within the network, that the traffic is to be transported using an address associated with the backup node. Thus, while the failover operation may provide a mechanism by which normal traffic flow can be restored when a node and/or link fails, the period of time to perform the failover operation may cause a disruption in services provided by the network and/or a loss of packets.

SUMMARY

According to one aspect, a device may include a processor to: receive traffic that is destined for a client device; identify, based on receiving the traffic, an address associated with the traffic; and determine whether the address is associated with an aggregate interface, the aggregate interface being associated with a first port and a second port. The first port may correspond to a first node in a first state, the first state indicating that the first node is available to forward the traffic to the client device, and the second port may correspond to a second node in a second state, the second state indicating that that the second node is not available to forward the traffic to the client device. The processor may also be to: transmit the traffic to the first node via the first port and to the second node, via the second port, when the address is associated with the aggregate interface. The transmitting the traffic may enable the second node to forward the traffic to the client device when the first node changes from the first state to the second state.

According to another aspect, a system may include a first node associated with a first state. The first state may indicate an availability to process or transport traffic. The first node may be to: receive the traffic, the traffic being destined for a client device; process the received traffic; detect a failure, associated with the first node, based on processing the received traffic; and output, based on detecting the failure, a notification indicating that the first node is changing from the first state to a second state. The second state may indicate an unavailability to process or transport the traffic. The system may also include a second node, associated with the second state, that receives the traffic. The second node may be to: receive the notification; cause a state, associated with the second node, to change from the second state to the first state based on receiving the notification; process the received traffic based on the change from the second state to the first state; and output the processed traffic to the client device.

According to still another aspect, a system may include a switch to: receive traffic that is destined for a client device; identify, based on receiving the traffic, an address associated with the traffic; and determine whether the address is associated with an aggregate interface. The aggregate interface may be based on a first port associated with the switch and a second port associated with the switch. The switch may also be to output the traffic via the first port and the second port. The system may also include two or more nodes to: receive the traffic via the first port and the second port; process the traffic received via the first port. The processing the traffic, received via the first port, being performed by a first node, of the two or more nodes. The two or more nodes may also be to: detect a failure associated with the first node; process the traffic, received via the second port, based on detecting the failure associated with the first node, the traffic, received via the second port, may be processed by a second node of the two or more nodes; and output, to the client device, the processed traffic received via the first port or the processed traffic received via the second port.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

Systems and/or methods, described herein, may enable a high availability security system (hereinafter referred to as "security system") to perform a failover operation without causing a disruption of network services and/or a loss of data. The security system may, for example, perform the failover operation when a first node and/or a first link, associated with the security system, degrades in performance or becomes unavailable to transport traffic. The security system may use an aggregate interface to cause the traffic, previously being transported via the first node and/or the first link, to be transported via a second node and/or a second link associated with the security system. The aggregate interface may be associated with a particular address (e.g., a media access control (MAC), an Internet protocol (IP) address and/or some other address), that enables the traffic to be transported, via the second node and/or the second link, using the particular address. Using the particular address may enable the failover operation to be performed without changing network topology (e.g., purging address tables, rebuilding address tables, etc.), which may enable the traffic to continue to be transported by the security system without a service disruption or a loss of data.

Figure 1A:
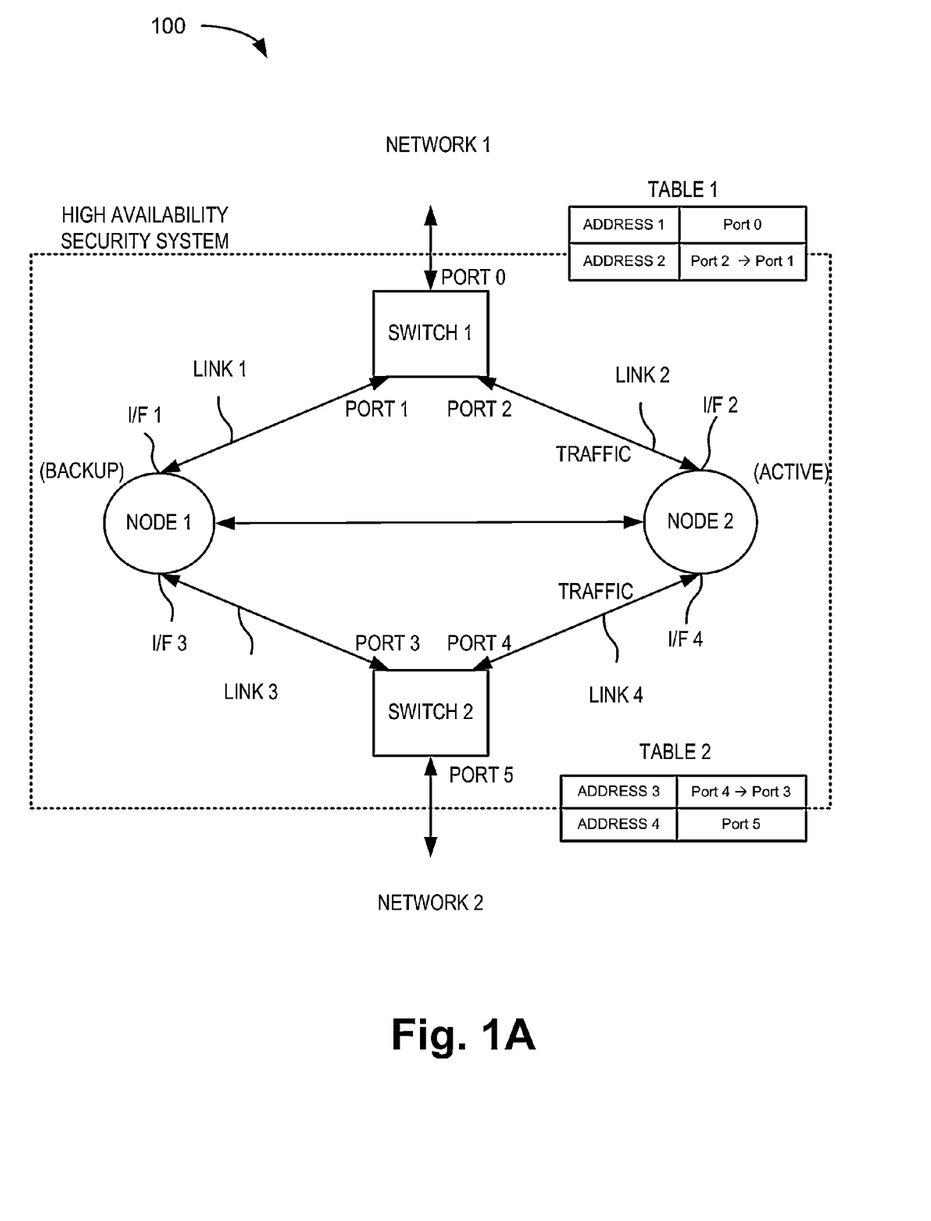
FIG. 1A is a diagram of an example high availability security system.

FIG. 1A is a diagram of an example high availability security system 100 (hereinafter referred to as "system 100"). As shown in FIG. 1A, system 100 may include a backup node (e.g., node 1) and an active node (e.g., node 2) that are each connected to a pair of switches (e.g., switch 1 and switch 2) by links (e.g., links 1-4). The active node and/or backup node may include components that receive, process, and/or transmit traffic. Each switch may receive traffic and may switch the traffic from one link to another link. Each link may connect a node (e.g., node 1 or node 2) to a switch (e.g., switch 1 or switch 2) and may enable traffic to be transmitted between the node and the switch.

The backup node may be connected to the first switch (e.g., switch 1) via a first link (link 1) and a first interface (e.g., interface (I/F) 1), and to the second switch (e.g., switch 2) via a third link (e.g., link 3) and a third interface (e.g., I/F 3). The active node may be connected to the first switch via a second link (e.g., link 2) and a second interface (e.g., I/F 2), and to the second switch via a fourth link (e.g., link 4) and a fourth interface (e.g., I/F 4). The first switch may send traffic to, and/or receive traffic from, a first network (e.g., network 1) via a first port (e.g., port 0); the backup node via a second port (e.g., port 1); and/or the active node via a third port (e.g., port 2). The second switch may send traffic to, and/or receive traffic from, the backup node via a fourth port (e.g., port 3); the active node via a fifth port (e.g., port 4); and a second network (e.g., network 2) via a sixth port (e.g., port 5).

During normal operation, the first switch may, for example, receive traffic from the first network and may use a first address table (e.g., table 1) to send the traffic to the second switch via the second link, the active node, and the fourth link. The first address table may, for example, identify a first address associated with the first network (e.g., address 1) and the first port (e.g., Port 0) via which the traffic is received. The first address table may also, or alternatively, include a second address, associated with the second node (e.g., for a layer three protocol) and/or the second network (e.g., for a layer two protocol) and the third port (e.g., Port 2) via which the traffic is to be transmitted. The layer two protocol may correspond to a data link layer protocol (e.g., based on the Open Systems Interconnection (OSI) model of the International Organization for Standardization) and the layer three protocol may correspond to a network layer protocol (e.g., based on the OSI Model).

The second switch may receive the traffic and may use a second address table (e.g., table 2) to send the traffic to the second network. The second address table may, for example, identify a third address (e.g., address 3) that corresponds to the first network (e.g., for a layer two protocol) and/or the active node (e.g., for a layer three protocol) and the fifth port (e.g., Port 4) via which the traffic is received. The second address table may also, or alternatively, include a fourth address, associated with the second network and the sixth port (e.g., Port 5) via which the traffic is to be transmitted. Similarly, the second switch may receive traffic from the second network and may, based on the second address table, send the traffic to the first switch via the fourth link, the active node, and/or the second link. The first switch may receive the traffic and may, based on the first address table, send the traffic to the first network.

System 100 may determine that a failover operation is to be performed when a failure occurs with respect to the active node, the second link, and/or the fourth link, such as when the active node becomes unavailable, performance degrades, etc., and/or when the second link and/or fourth link becomes inoperable (e.g., can no longer transport traffic, etc.). When the active node, the second link, and/or the fourth link experience a failure, the active node may, in one example, toggle the second link and/or the fourth link by causing the second link and/or fourth link to change from an active state, to an inactive state, and back to an active state. Toggling the links may cause the first switch and/or the second switch to purge the address tables (e.g., table 1 and/or table 2) In this example, the active node may correspond to a layer two node.

Additionally, or alternatively, when the active node, the second link, and/or the fourth link experience a failure, the active node may send a notification to the backup node indicating that the active node, the second link, and/or fourth link are changing to an inactive state. In the inactive state, the active node may become a backup node within system 100 and may not be available to process and/or transmit traffic. The backup node may receive the notification and may change from an inactive state to an active state. In the active state, the backup node may be available to transmit traffic and may become an active node within system 100. Additionally, or alternatively, the backup node (e.g., node 1), now in the active state, may cause the first link and/or the third link to change to an active state. In this example, when the backup node corresponds to a layer three node, the backup node may provide a notification to the first switch and/or the second switch indicating that a port, associated with the backup node, is to be used to transmit the traffic.

The layer two node may use data link layer protocols (e.g., based on layer two of the OSI model) and may process traffic based on particular layer two addresses (e.g. media access control (MAC) addresses or some other layer two addresses). The layer three node may use network layer protocols (e.g., based on layer three of the OSI model) and may process traffic based on particular layer three addresses and/or layer two addresses (e.g. IP addresses, MAC addresses, and/or some other layer two addresses).

The first switch and/or the second switch may, based on the purged address tables, replicate packets received from the first network and/or the second network, respectively, and may provide (or flood) the replicated packets to some or all ports associated with the first switch and/or the second switch. This may enable the backup node (e.g., node 1), the first network, and/or the second network to receive the packets and to forward the packets to the first switch or the second switch. The first switch may rebuild the first table by associating the second port (e.g. shown as Port 1) with the second address (e.g., address 2) and/or the second switch may rebuild the second address table by associating the fourth port (e.g., shown as Port 3) with the third address (e.g., address 3). Rebuilding the tables may allow traffic to be transported via the backup node and/or the first and third links. A service disruption may occur, due to lost traffic (e.g., dropped packets, etc.), during the failover operation due to purging the address tables, replicating and flooding packets, and/or rebuilding the address table.

Figure 1B:
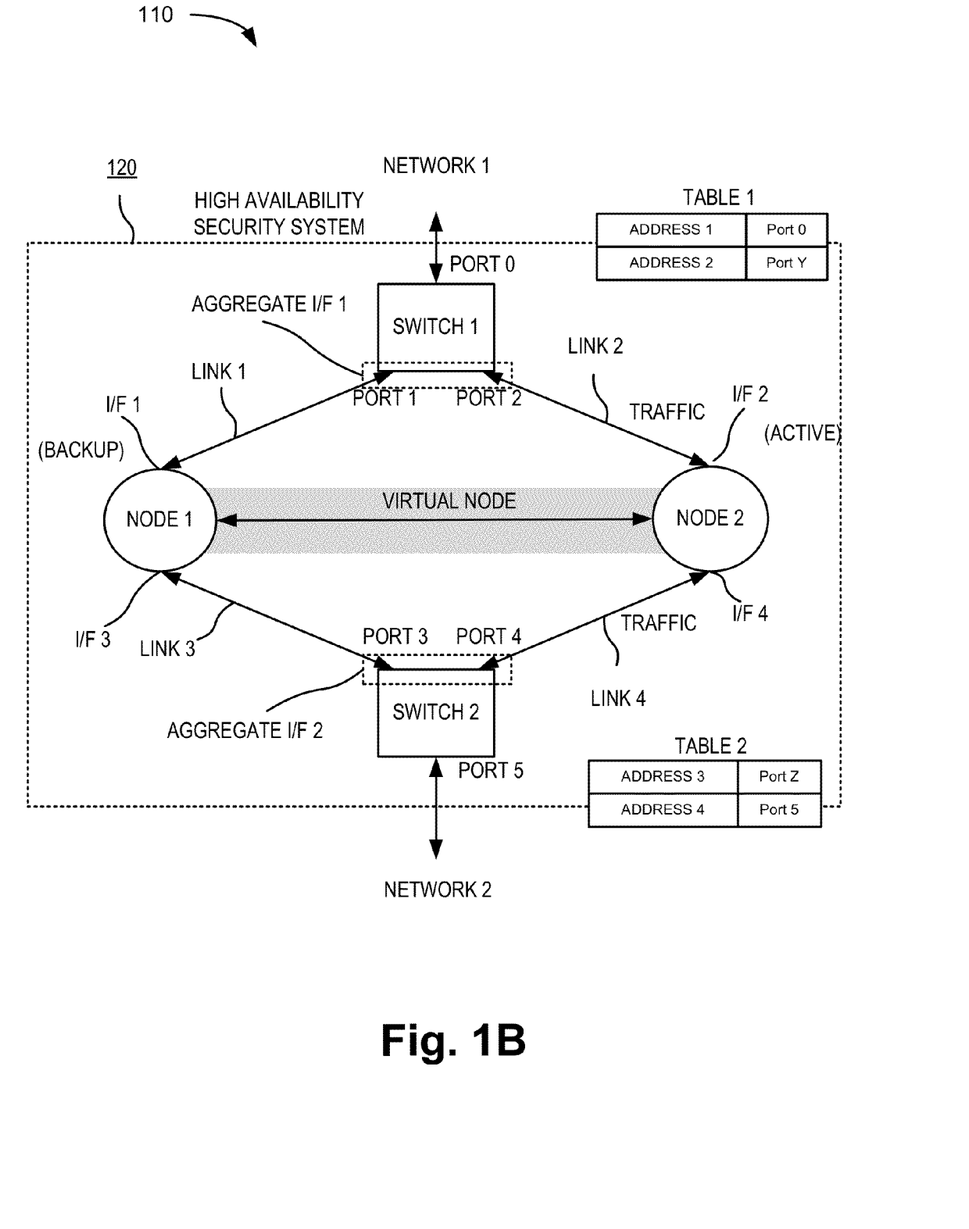
FIG. 1B is a diagram illustrating an overview of an example implementation described herein.

FIG. 1B is a diagram illustrating an overview 110 of an example implementation described herein. As shown in FIG. 1B, a high availability security system 120 (hereinafter referred to as "system 120") may include a collection of devices described above in connection with system 100 of FIG. 1A. For example, system 120 may include the active node, the backup node, the pair of switches (e.g., switch 1 and switch 2), and the set of links (e.g., links 1-4). System 120 may also include a first aggregate interface (e.g., shown as a dashed box labeled "aggregate I/F 1"), a second aggregate interface (e.g., shown as a dashed box labeled "aggregate I/F 2"), and a virtual node (e.g., shown as a shaded region, between node 1 and node 2, labeled "virtual node").

The first aggregate interface may logically associate the first interface associated with the backup node with the second interface associated with the active node. The first aggregate interface may enable the first switch to communicate, via the second or third ports (e.g., port 1 and/or port 2, respectively), with the virtual node via the first link and/or the second link, respectively. The second aggregate interface may logically associate the third interface associated with the backup node with the fourth interface associated with the active node. The second aggregate interface may enable the second switch to communicate, via the fourth and/or fifth ports (e.g., port 3 and/or port 4, respectively), with the virtual node via the third link and/or the fourth link, respectively. The virtual node may be logically associated with the active node (e.g., node 2) and the backup node (e.g., node 1). For example, the active node and backup node may share the particular address that is associated with the virtual node. Thus, a first address table (e.g., table 1), may be used by the first switch to forward traffic to the virtual node. The first table may associate the second address (e.g., address 2 as described above with respect to FIG. 1A) with the second and third ports (e.g., shown as port Y), which may enable the first switch to provide traffic to the virtual node via the first aggregate interface and/or over the first and/or second links. Additionally, or alternatively, a second address table (e.g., table 2), may be used by the second switch to receive traffic from the virtual node. The second table may associate the third address (e.g., address 3 as described above with respect to FIG. 3) with the fourth and fifth ports (e.g., shown as port Z), which may enable the second switch to receive traffic from the virtual node via the second aggregate interface and/or the third and/or fourth links.

When the second link is in the active state (sometimes referred to as a "collecting/distributing state"), the second link may be available to collect, transport, and/or distribute traffic. When the first link in is in the inactive state (sometimes referred to as an "attached state"), the first link may be available to transport control traffic, but may not be available to collect, transport, and/or distribute traffic (e.g., to and/or from the first or second networks).

When the second link, the fourth link, and/or the active node fail, the first switch may perform a failover operation in a manner that does not include purging address tables and/or flooding packets to relearn the address tables. For example, when the active node is a layer two node, the active node may not toggle the second link and/or the fourth link from the active state, to the inactive state, and back to the active state. In this example, the first switch may use the first address table to provide the traffic to the backup node via the first aggregate interface and using the same address (e.g., address 2 associated with port Y) that was used to provide the traffic to the active node prior to the failover operation. Additionally, or alternatively, the second switch may use the second address table to receive the traffic from the backup node via the second aggregate interface and using the same address (e.g., address 3 associated with port Z) that was used to receive the traffic from the active node prior to the failover operation.

By communicating with the virtual node, via the aggregate interface, the first switch and/or the second switch may perform the failover operation without purging address tables, replicating and/or flooding packets to the ports of the first switch and/or second switch, and/or rebuilding the address tables. Additionally, or alternatively, the aggregated interface and/or virtual node may enable the active node to initiate the failover operation without toggling links and/or providing a notification, to the first and/or second switches, indicating that links are changing from an active to an inactive state. Performing the failover operation without purging the address tables, replicating and/or flooding the packets, and/or rebuilding the address tables may enable system 120 to process traffic without a service disruption and/or without losing traffic due to dropped packets.

Figure 2:
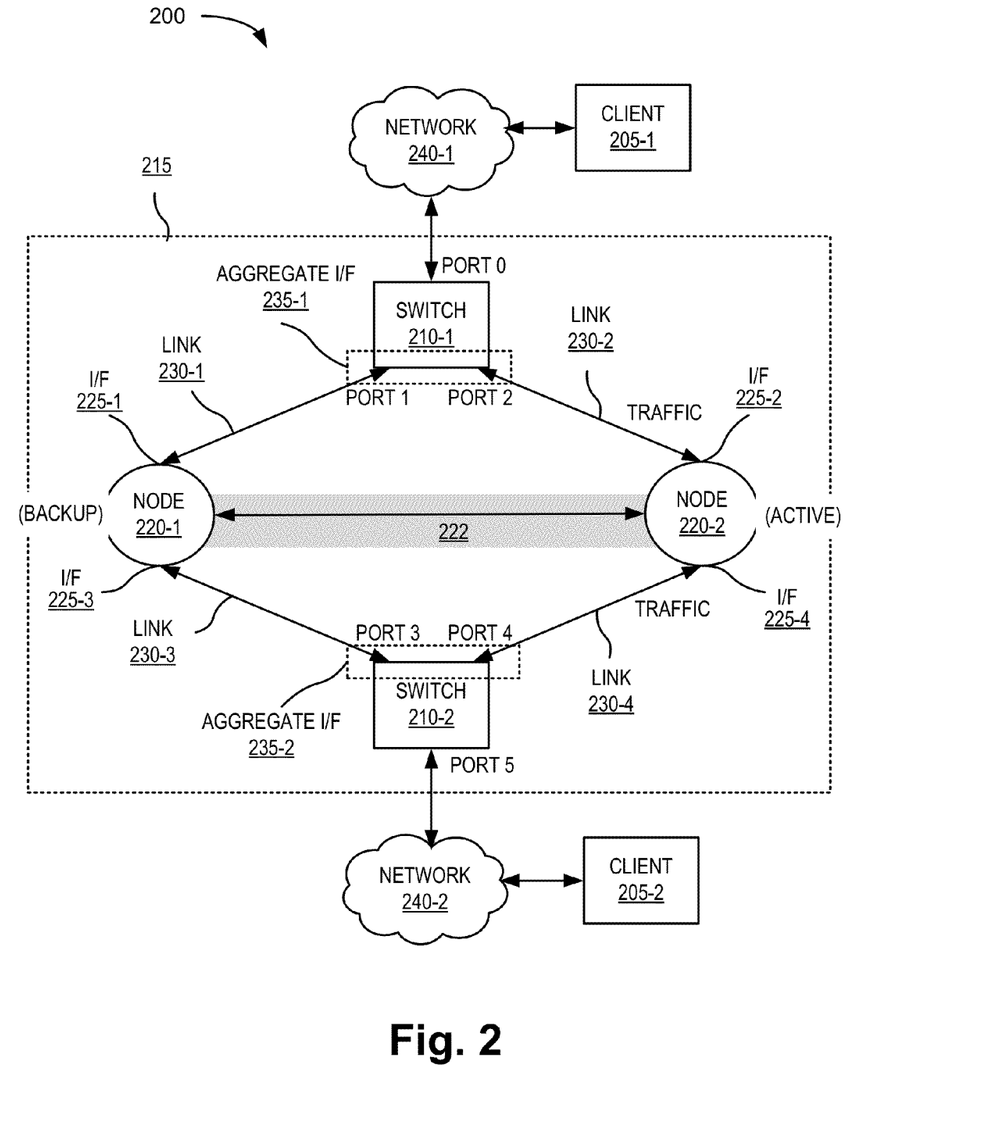
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include a pair of client devices 205-1 and 205-2 (hereinafter referred to collectively as "clients 205" and individually as "client 205"), a high availability security system 215 (hereinafter referred to as "system 215"), and a pair of networks 240-1 and 240-2 (hereinafter referred to collectively as "networks 240" and individually as "network 240"). The number of devices, systems, or networks, illustrated in FIG. 2, is provided for explanatory purposes only. In practice, there may be additional devices, systems, and/or networks; fewer devices, systems, and/or networks; different devices, systems, and/or networks; or differently arranged devices, systems, and/or networks than illustrated in FIG. 2.

Also, in some implementations, one or more of the devices and/or systems, of environment 200, may perform one or more functions described as being performed by another one or more of the devices and/or systems of environment 200. The devices, systems, and/or networks of environment 200 may interconnect via wired connections, wireless connections, or a combination of wired and wireless connections.

Client 205 may include any computation and communication device that is capable of communicating with network 240. For example, client 205 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a tablet computer, a landline telephone, a set top box (STB), a television, a camera, a personal gaming system, or another type of computation and communication device. Alternatively, or additionally, client 205 may be a server device that may gather, process, search, store, and/or provide information in a manner similar to that described herein.

System 215 may provide high availability security services associated with traffic (e.g., packets) being transported between a first network (e.g., network 240-1) and a second network (e.g., network 240-2). System 215 may include a pair of switches 210-1 and 210-2 (hereafter referred to collectively as "switches 210" and individually as "switch 210"), a pair of nodes 220-1 and 220-2 (hereinafter referred to collectively as "nodes 220" and individually as "node 220") on which a virtual node 222 is based, and a set of links 230-1-230-4 (hereafter referred to collectively as "links 230" and individually as "link 230").

Switch 210 may include one or more devices that receive and/or transmit traffic (e.g., packets) and/or are capable of communicating with networks 240 and/or nodes 220. Switches 210 may also include a memory and/or storage device that stores network topology information, routing tables, and/or packet forwarding tables. Switch 210 may include a collection of ports via which switch 210 sends and/or receives traffic. For example, switch 210-1 may receive traffic from network 240-1 and via a first port (e.g., port 0) and may transmit the traffic toward node 220-1 via a second port (e.g., port 1) and/or node 220-2 via a third port (e.g., port 2). Additionally, or alternatively, switch 210-1 may receive traffic from node 220-1 via the third port and/or node 220-2 via the fourth port and may transmit the traffic to network 240-1 via the first port. Switch 210-1 may, for example, transmit traffic to and/or receive traffic from nodes 220-1 and/or 220-2 via links 230 (e.g., 230-1 and/or 230-2, respectively). Link 230 may enable nodes 220 to communicate with switches 210 via a wired communication mechanism and/or a wireless communication mechanism.

Switch 210-1 may include an aggregate I/F 235-1 associated with a combination of interfaces 225-1 and 225-2 via which switch 210-1 communicates with virtual node 222. For example, switch 210-1 may logically associate I/Fs 225-1 and 225-2 to create aggregate IF 235-1. Switch 210-1 may also, or alternatively, create an address table that associates an address (e.g., a MAC address, an IP address, etc.) with aggregate I/F 235-1. Switch 210-1 may also, or alternatively, use aggregate I/F 235-1 to monitor a state (e.g., active, inactive, etc.) associated with links 230-1 and 230-2.

Switch 210-2 may receive traffic from network 240-2 via a sixth port (e.g., port 5) and may transmit the traffic to node 220-1 and/or node 220-2 via a fourth port (e.g., port 3) and/or a fifth port (e.g., port 4), respectively. Additionally, or alternatively, switch 210-2 may receive traffic from switch 210-1, via nodes 220-1 and/or 220-2, and may transmit the traffic to network 240-2. Switch 210-2 may, for example, transmit traffic to and/or receive traffic from nodes 220-1 and/or 220-2 via links 230-3 and/or 230-4, respectively. Switch 210-2 may include an aggregate I/F 235-2 associated with a combination of I/Fs 225-3 and 225-4 via which switch 210-2 connects to links 230-3 and 230-4, respectively. For example, switch 210-2 may logically associate I/Fs 225-3 and 225-4 to create aggregate I/F 235-2. Switch 210-2 may also, or alternatively, create an address table that associates an address with aggregate I/F 235-2 and may use aggregate I/F 235-2 to monitor a state associated with links 230-3 and 230-4.

Node 220 may take the form of a routing device, a switching device, a multiplexing device, or a device that performs a combination of routing, switching, and/or multiplexing functions. In one example implementation, node 220 may be a digital device. Alternatively, or additionally, node 220 may be an optical device, a combination of a digital device and an optical device, etc.

Node 220 may include an internal or an external memory that stores information associated with node 220 operations. In one example, node 220 may store, in the memory, network topology information, routing tables, and/or packet forwarding tables. Node 220 may receive, process, and/or transmit packets traversing environment 200. Node 220 may add and/or append (push) information (e.g., headers, trailers, tags, etc.) to incoming and/or outgoing packets. Node 220 may remove and/or extract information from incoming and/or outgoing packets.

Node 220-1 may include pair of interfaces (I/Fs) 225-1 and 225-3 (hereinafter referred to collectively as "I/Fs 225" and individually as "I/F 225") via which node 220-1 connects to links 230-1 and 230-3, respectively. Node 220-1 may communicate with switch 210-1 via link 230-1 and may communicate with switch 210-2 via link 230-3. Similarly, node 220-2 may include another pair of I/Fs 225-2 and 225-4 via which node 220-2 connects to links 230-2 and 230-4, respectively. Node 220-2 may communicate with switch 210-1 via link 230-2 and may communicate with switch 210-2 via link 230-4. Node 220 may be in an active state or an inactive state. When in the inactive state, node 220 may not receive and/or transmit traffic, but may transmit and/or receive control signals if node 220 is operable. When in the active state, node 220 may transmit and/or receive traffic and/or control signals. Additionally, or alternatively, nodes 220 may exchange notifications, based on a control protocol (e.g., a link aggregation control protocol (LACP) and/or some other control protocol), that identifies a state of each node 220 and/or whether a state is changing.

Node 220 may, in one example, correspond to a layer two node 220 and may use a data link protocol (e.g., a point-to-point (PPP) protocol, a media access control (MAC) protocol, etc.) to transmit and/or receive traffic. Layer two node 220 may also, or alternatively, maintain an address table (e.g., a MAC address table). Node 220 may, also, or alternatively, correspond to a layer three node 220 and may use a network protocol (e.g., an IP protocol, such as IP protocol version six (IPv6), IPv4, etc.) to transmit and/or receive traffic.

Virtual node 222 may include one or more nodes 220 that receive and/or transmit traffic (e.g., shown as the shaded area 222 within FIG. 2). Virtual node 222 may include an address (e.g., a MAC address, an IP address, etc.) that enables virtual node 220 to communicate with networks 240 via switches 210 and/or links 230. The one or more nodes 220, associated with virtual node 222, may share the address.

Network 240 may include one or more wired and/or wireless networks. For example, network 240 may include a cellular network, the Public Land Mobile Network (PLMN), a second generation (2G) network, a third generation (3G) network, a fourth generation (4G) network (e.g., a Long Term Evolution (LTE) network), a fifth generation (5G) network, and/or another network. Additionally, or alternatively, network 240 may include a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

Figure 3:
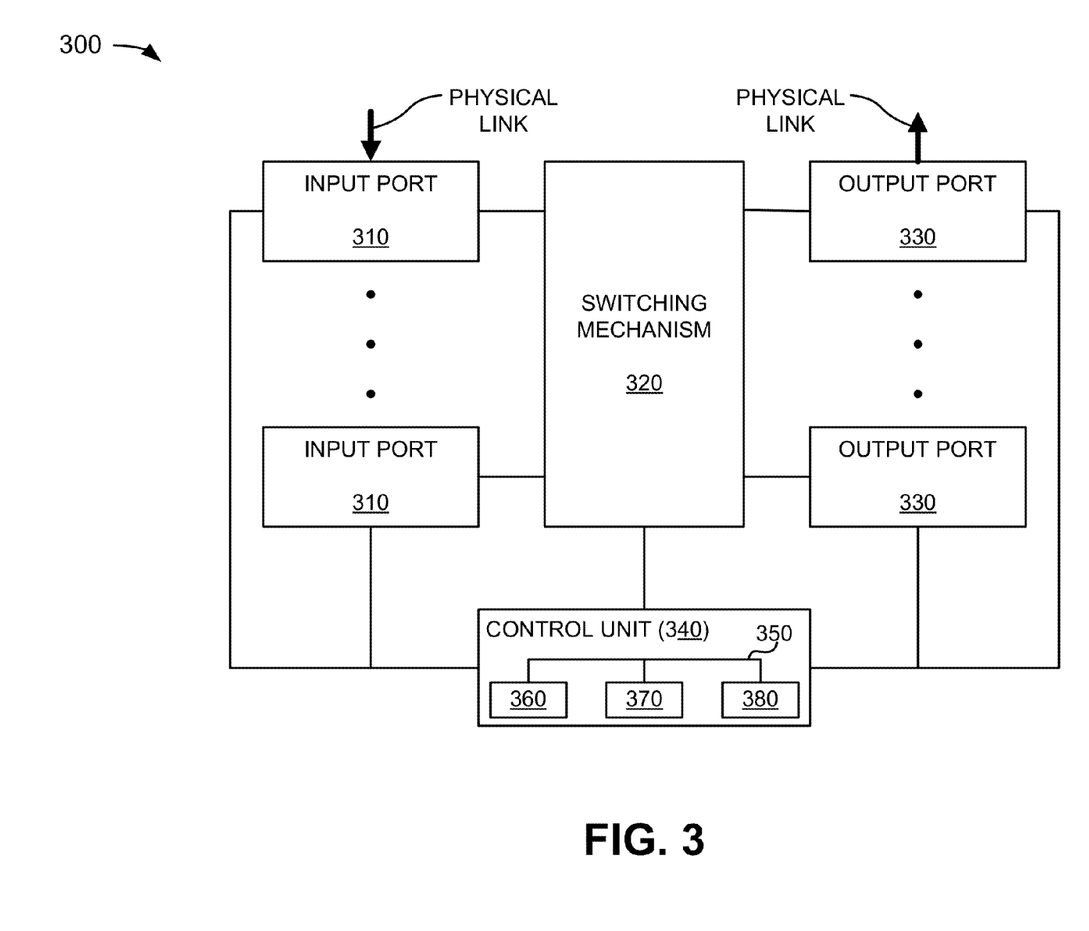
FIG. 3 is a diagram of example components of a device that may correspond to a switch and/or a node of the environment of FIG. 2.

FIG. 3 is a diagram of example components of a device 300 that may correspond to switch 210 and/or node 220 of environment 200. In some instances, switch 210 and/or node 220 may include one or more devices 300. As shown in FIG. 3, device 300 may include input ports 310, a switching mechanism 320, output ports 330, and a control unit 340.

Input ports 310 may be a point of attachment for physical links and may be a point of entry for incoming traffic, such as packets. Input ports 310 may carry out data link layer encapsulation and decapsulation. In an example implementation, input ports 310 may send and/or receive packets.

Switching mechanism 320 may interconnect input ports 310 with output ports 330. Switching mechanism 320 may be implemented using many different techniques. For example, switching mechanism 320 may be implemented via busses, crossbars, and/or with shared memories which may act as temporary buffers to store traffic from input ports 310 before the traffic is eventually scheduled for delivery to output ports 330.

Output ports 330 may store packets and may schedule packets for service on output physical links. Output ports 330 may include scheduling algorithms that support priorities and guarantees. Output ports 330 may support data link layer encapsulation and decapsulation, and/or a variety of higher-level protocols. In an example implementation, output ports 330 may send packets and/or receive packets.

Control unit 340 may use routing protocols and one or more forwarding tables for forwarding packets. Control unit 340 may connect with input ports 310, switching mechanism 320, and output ports 330. Control unit 340 may compute a forwarding table, implement routing protocols, and/or run software to configure and manage device 300. Control unit 340 may handle any packet whose destination address may not be found in the forwarding table.

In an example implementation, control unit 340 may include a bus 350 that may include a path that permits communication among a processor 360, a memory 370, and a communication interface 380. Processor 360 may include one or more processors, microprocessors, application-specific integrated circuits (ASICs), field programmable gate arrays (FPGAs), or other types of processing units that may interpret and execute instructions. Memory 370 may include a random access memory (RAM), a read only memory (ROM) device, a magnetic and/or optical recording medium and its corresponding drive, and/or another type of static and/or dynamic storage device that may store information and instructions for execution by processor 360. Memory 370 may also temporarily store incoming traffic (e.g., a header of a packet or an entire packet) from input ports 310, for processing by processor 360, before a packet is directed back to switching mechanism 320, queued in switching mechanism 320, and eventually scheduled to be sent to output ports 330. Communication interface 380 may include any transceiver-like mechanism that enables control unit 340 to communicate with other devices and/or systems.

Device 300 may perform certain operations, as described herein. Device 300 may perform these operations in response to processor 360 executing software instructions contained in a computer-readable medium, such as memory 370. A computer-readable medium may be defined as a non-transitory memory device. A memory device may include space within a single physical memory device or spread across multiple physical memory devices. The software instructions may be read into memory 370 from another computer-readable medium, such as a data storage device, or from another device via communication interface 380. The software instructions contained in memory 370 may cause processor 360 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more other tasks described as being performed by one or more other components of device 300.

Figure 4:
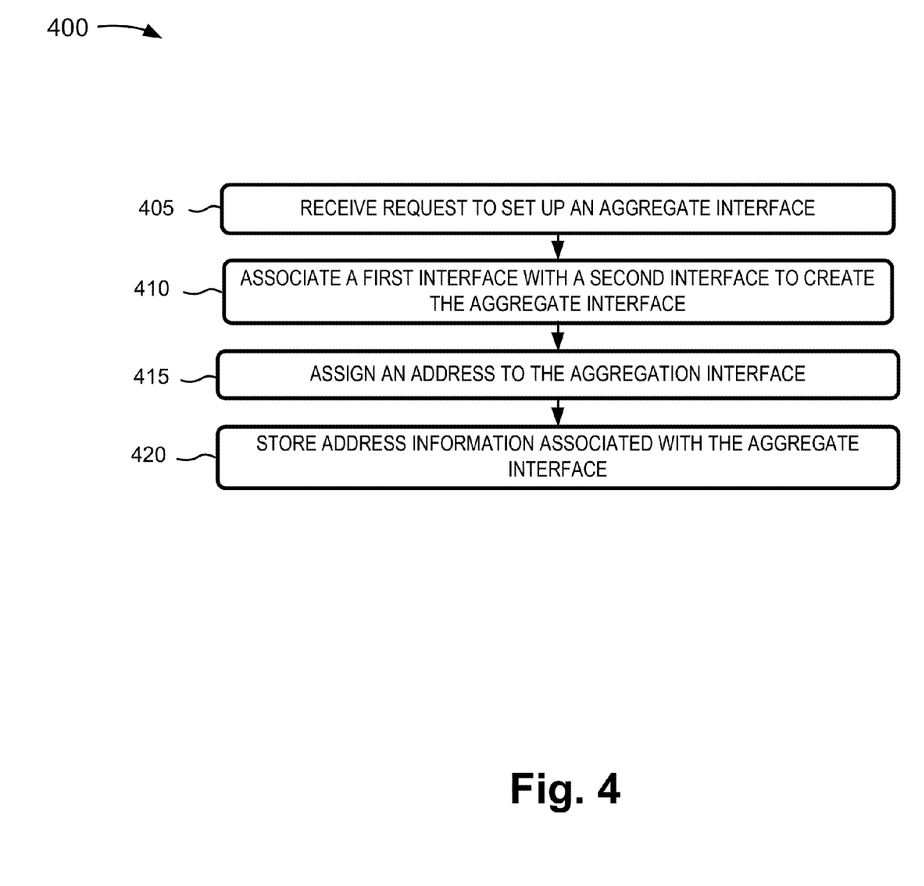
FIG. 4 is a flow chart of an example process for establishing an aggregate interface within a high availability security system.
Figure 5:
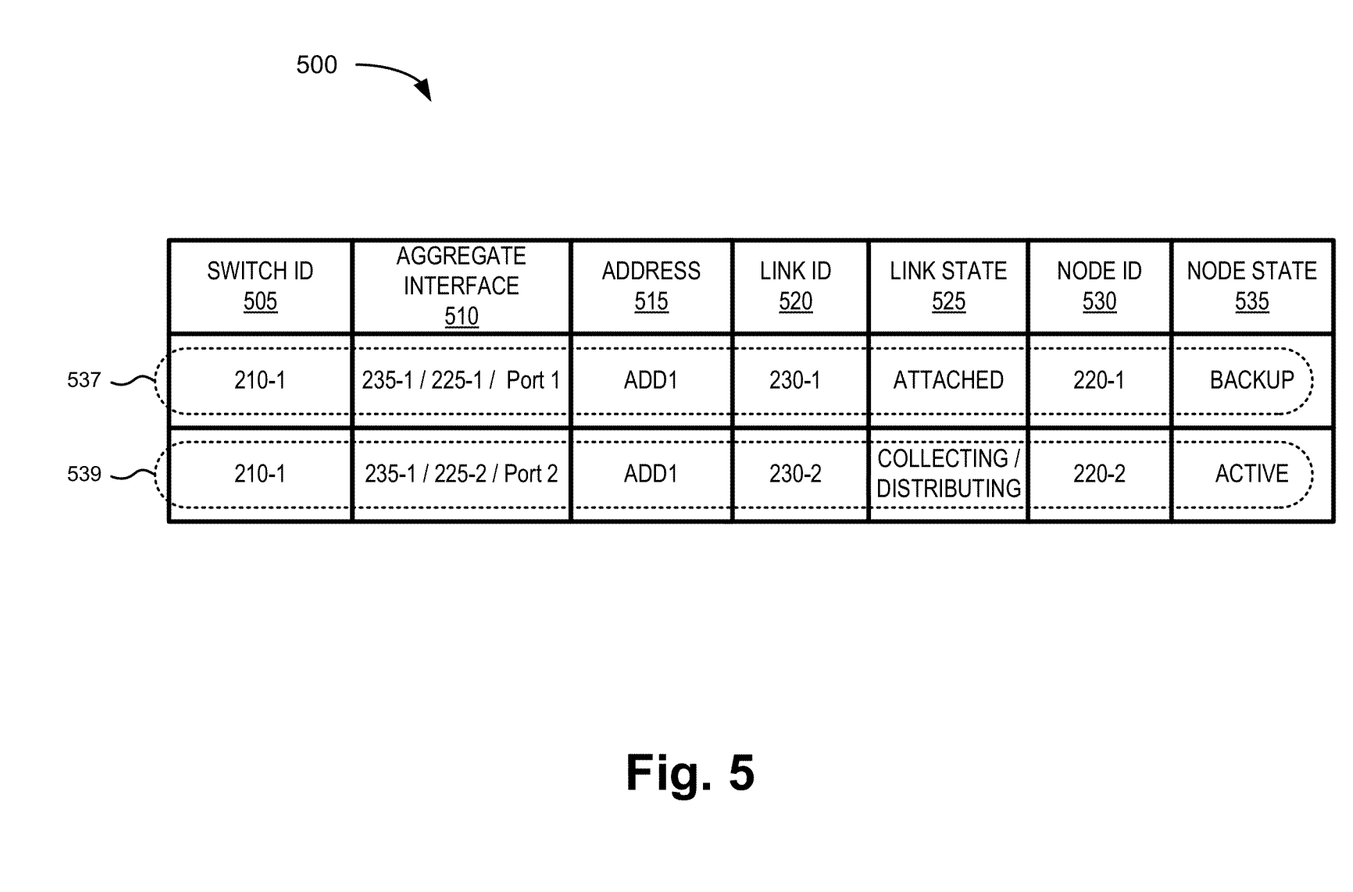
FIG. 5 is a diagram of an example data structure that stores state information associated with the aggregate interface.

FIG. 4 is a flow chart of an example process 400 for establishing an aggregate interface within system 215. In one example implementation, process 400 may be performed by switch 210. Alternatively, or additionally, some or all of process 400 may be performed by a device or collection of devices separate from, or in combination with, switch 210. FIG. 5 is a diagram of an example data structure 500 that stores information used to set up an aggregate interface within system 215. In the description below, a portion of process 400 will be described with references to data structure 500 of FIG. 5.

As shown in FIG. 4, process 400 may include receiving a request to set up an aggregate interface (block 405) and associating a first interface with a second interface to create the aggregate interface (block 410). For example, an operator of system 215 may desire to set up an aggregate interface associated with switch 210 and may send a request to switch 210 to set up the aggregate interface. In one example, the operator may communicate with switch 210, via network 240, using client 205. Additionally, or alternatively, the operator may use client 205, directly connected to switch 210, to send the request. In one example, the operator may interact with a user interface, provided by client 205, which enables client 205 to send the request. Additionally, or alternatively, the operator may enter an instruction into a command line, provided by client 205, which enables client 205 to send the request.

For example, switch 210-1 may receive, via a first port (e.g., port 0), the request and may identify a first I/F 225 (e.g., I/F 225-1) via which traffic is received from and/or transmitted to a first node 220 (e.g., node 220-1) and may identify a second I/F 225 (e.g., I/F 225-2) via which traffic is received from and/or transmitted to a second node 220 (e.g., node 220-2). Switch 210 may associate first I/F 225 and second I/F 225 to create aggregate I/F 235 (e.g., aggregate I/F 235-1). Additionally, or alternatively, switch 210 may associate a second port (e.g., port 1) and a third port (e.g., port 2), to create aggregate I/F 235.

As also shown in FIG. 4, process 400 may include assigning an address to the aggregate interface (block 415). For example, switch 210-1 may assign an address to aggregate I/F 235 to be used to transmit traffic to first node 220 and/or second node 220. In one example, when first node 220 and second node 220 correspond to layer three nodes 220, the address may correspond to an address (e.g., a MAC address, an IP address, etc.) associated with virtual node 222.

For example, switch 210-1 may receive a packet (e.g., based on an address resolution protocol (ARP), etc.), from client device 205-1, that include an address associated with first node 220 and/or second node 220, and/or a source address associated with client 205-1. Switch 210-1 may also, or alternatively, associate the source address with a port (e.g., port 0) via which the packet was received. Switch 210-1 also, or alternatively, replicate the packet and may provide replicated packets to ports associated with switch 210-1. In one example, a first replicated packet may be received by first node 220 and a second replicated packet may be received by second node 220 via ports associated with aggregate I/F 235-1 (e.g., port 1 and port 2, respectively). First node 220 may receive the first replicated packet via link 230-1 and I/F 225-1 and second node 220 may receive the second replicated packet via link 230-2 and I/F 225-2.

When first node 220 is in an inactive state, first node 220 may drop the first replicated packet and/or may not respond to switch 210-1. Additionally, or alternatively, when I/F 225-1 is in an inactive state (e.g., an attached state, etc.), first node 220 may drop the packet and/or may not respond to switch 210-1. When second node 220 is in an active state, second node 220 may provide a packet, to switch 220-1, that indicates that second node 220 received the second replicated packet and/or that includes the address. Additionally, or alternatively, when I/F 225-2 is in an active state (e.g., a collecting and/or distributing state, etc.), second node 220 may provide the packet to switch 220-1.

Switch 210-1 may receive the packet from second node 220 and may associate the address with ports (e.g., port 1 and/or port 2) associated with aggregate I/F 235-1 (e.g., shown as port Y in FIG. 1B). Associating the address with aggregate I/F 235-1 may cause the address to be associated with the second and/or third ports (e.g., ports 1 and/or 2) and/or I/Fs 225-1 and/or 225-2.

Additionally, or alternatively, when first node 220 and second node 220 correspond to layer two nodes 220, the address (e.g., a MAC address) may correspond to an address associated with a destination address (e.g., associated client 205-2) to which traffic is to be transmitted. For example, switch 210-1 may receive a packet (e.g., based on an address resolution protocol (ARP), etc.), from client device 205-1, that includes a destination address associated with client 205-2 and/or a source address associate with client 205-1. Switch 220-1 may associate the source address with a port (e.g. port 0) via which the packet was received from client 205-1. Switch 220-1 may, in a manner similar to that described above, replicate the packet and may provide the replicated packets to ports associated with switch 210-1.

Virtual node 222 may receive replicated packets from links 230-1 and 230-2 via the second and third ports, respectively, that are associated with aggregated I/F 235-1. First node 220 (e.g., as backup node 220) may, as described above, drop the replicated packet and second node 220 (e.g., as active node 220) may process the packet. Second node 220 may, for example, replicate packet and may provide the packet to switch 210-2 via link 230-4. Switch 210-2 may receive a replicated packet from second node 220 and via a port (e.g., port 4) associated with link 230-4. In one example, the port may be associated with aggregate I/F 235-2 that is based on I/Fs 225-3 and/or 225-4 (e.g., and/or ports 3 and 4, respectively). Switch 210-2 may associate the source address with the ports (e.g., port 3 and port 4) associated with aggregate I/F 235-2 (e.g., shown as port Z in FIG. 1B). Switch 210-2 may replicate the packet and may transmit the packet to ports associated with switch 210-2. Client 205-2 may receive a replicated packet and may provide, to switch 210-2, a packet that includes the destination address.

Switch 210-2 may receive the packet, from client 205-2, and may associate the destination address with a port via which the packet was received (e.g., port 5). Switch 210-2 may provide the packet to second node 220 via aggregate I/F 235-2 and based on the association of the source address with aggregate I/F 235-2. Second node 220 may receive the packet and may provide the packet to switch 210-1. Switch 210-1 may receive the packet and may associate with destination address with ports (e.g., port 1 and/or port 2) associated with aggregation I/F 235-1 (e.g., shown as port Y in FIG. 1B). Switch 210-1 may provide the packet to client 205-1, which may enable client 205-1 to transmit traffic to client 205-2 via system 215.

As further shown in FIG. 4, process 400 may include storing address information associated with the aggregate interface (block 420). For example, switch 210-1 may assign an inactive state (e.g., inactive, attached, etc.) to first link 230 based on the determination that first node 220 is a backup node 220. Additionally, or alternatively, switch 210-1 may assign an active state (e.g., active, collecting, distributing, etc. state) to second link 230 based on the determination that second node 220 is an active node 220.

Additionally, or alternatively, switch 210-1 may store, in a data structure, address information associated aggregate I/F 235. For example, as shown in FIG. 5, data structure 500 may include a collection of fields, such as a switch identifier (ID) field 505, an aggregate interface field 510, an address field 515, a link ID field 520, a link state field 525, a node ID field 530, and a node state field 535. Data structure 500 includes fields 505-535 for explanatory purposes. In practice, data structure 500 may include additional fields, fewer fields, different fields, or differently arranged fields than are described with respect to data structure 500. Additionally, or alternatively, data structure 500 may be stored in a storage device associated with switch 210.

Switch ID field 505 may store information (e.g., a device identifier, an electronic serial number, a MAC address, etc.) that identifies a particular switch 210 associated with system 215. Aggregate interface field 510 may store information (e.g., an aggregate interface identifier, etc.) that identifies aggregate I/F 235 associated with the particular switch 210. Additionally, or alternatively, aggregate interface field 510 may store information (e.g., an interface identifier, etc.) that identifies a one or more I/Fs 225 with which aggregate I/F 235 is associated. Additionally, or alternatively, aggregate interface field 510 may store information (e.g. a port identifier, etc.) that identifies one or more ports with which aggregate I/F 235 is associated.

Address field 515 may store information that identifies an address (e.g., a MAC address, an IP address, etc.) assigned to aggregate I/F 235 as identified in aggregate interface field 510. Link ID field 520 may store information that identifies link 230 that is connected to one I/F 225 and/or port identified in aggregate interface field 510. Link state field 525 may store information that identifies a state associated with link 230 identified in link ID field 520 and/or associated with I/F 225 and/or a port identifier in aggregate interface field 510. In one example, link state field 525 may store an indication that link 230, I/F 225, and/or the port is in an active state (e.g., active, collecting, distributing, etc.). Alternatively, link state field 525 may store an indication that link 230, I/F 225, and/or the port is in an inactive state (e.g., inactive, attached, etc.).

Node ID field 530 may store information (e.g., a node identifier, an electronic serial number, a MAC address, etc.) that identifies node 220 with which link 230, identified in link ID field 520, is associated. Node state field 535 may store information that identifies a state associated with node 220 identified in node ID field 530. In one example, node state field 535 may store an indication that node 220 is in an active state and/or is an active node 220. Alternatively, node state field 535 may store an indication that node 220 is in an inactive state and/or is a backup node 220.

By way of example, switch 210 may store, in data structure 500, state information, associated aggregate I/F 235 of switch 210. For example, switch 210-1 may store information that identifies a first switch 210 (e.g., 210-1) and/or information that identifies a first I/F 225 and/or a first port associated with the first aggregate I/F 235 (e.g., 235-1/225-1/Port 1) (e.g., as shown by ellipse 537 of FIG. 5). Additionally, or alternatively, switch 210-1 may store information that identifies an address (e.g., ADD1) assigned to the first aggregate I/F 235; information that identifies the first link 230 (e.g., 230-1) that is connect to the first I/F 225 and/or first port; and/or an indication that first link 230 is in an inactive state (e.g., attached) (e.g., as shown by ellipse 537 of FIG. 5). Switch 210-1 may also, or alternatively, store information that identifies a first node 220 (e.g., 220-1) that is connected to first link 230 and/or an indication that first node 220 is a backup node 220 (e.g., backup) (e.g., as shown by ellipse 537 of FIG. 5).

Additionally, or alternatively, switch 210-1 may store, in data structure 500, state information that identifies switch 210-1 (e.g., 210-1) and/or information that identifies a second I/F 225 and/or a second port associated with the first aggregate I/F 235 (e.g., 235-1/225-2/Port 2) (e.g., as shown by ellipse 539 of FIG. 5). Additionally, or alternatively, switch 210-1 may store information that identifies the address (e.g., ADD1) assigned to the first aggregate I/F 235; information that identifies a second link 230 (e.g., 230-2) that is connect to the second I/F 225 and/or the second port; and/or an indication that second link 230 is in an active state (e.g., collecting/distributing) (e.g., as shown by ellipse 539 of FIG. 5). Switch 210-1 may also, or alternatively, store information that identifies a second node 220 (e.g., 220-2) that is connect to second link 230 and/or an indication that second node 220 is an active node 220 (e.g., active) (e.g., as shown by ellipse 539 of FIG. 5).

Figure 6:
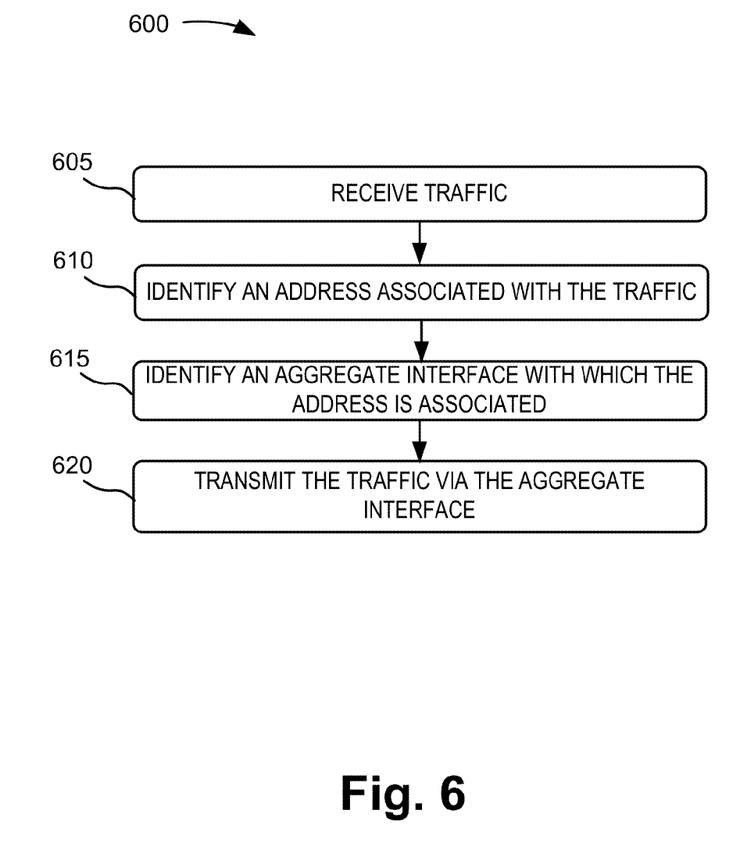
FIG. 6 is a flow chart of an example process for performing a failover operation by a switch.

FIG. 6 is a flow chart of an example process 600 for performing a failover operation by a switch. In one example implementation, process 600 may be performed by switch 210-1. Alternatively, or additionally, some or all of process 600 may be performed by a device or collection of devices separate from, or in combination with, switch 210-1.

Assume, in the description below, that node 220-1 is in an inactive state and, thus, represents a backup node 220 within system 215. Assume also that node 220-2 is in an active state and, thus, represents an active node 220 within system 215. Assume further that link 230-1 and link 230-3 are in an inactive state (e.g., an attached state) and that link 230-2 and link 230-4 are in an active state (e.g., a collecting and/or distributing state).

As shown in FIG. 6, process 600 may include receiving traffic (block 605) and identifying an address associated with the traffic (block 610). For example, a first client 205 (e.g., client 205-1) may transmit traffic, via a first network (e.g., network 240-1), to a second client 205 (e.g., client 205-2) via a second network (e.g., network 240-2). Switch 210-1 may receive the traffic from the first network 240. Switch 210-1 may obtain, from packets associated with the traffic, an address that identifies a manner in which the traffic is to be transmitted. When the traffic is being transmitted based on layer two protocol, the address may correspond to a destination device, such as client 20-5-2. When the traffic is being transmitted based on layer three protocol, the address may correspond to virtual node 222.

As also shown in FIG. 6, process 600 may include identifying an aggregate interface with which the address is associated (block 615) and transmitting the traffic via the aggregate interface (block 620). For example, switch 210-1 may access an address table (e.g., data structure 500 of FIG. 5) to identify a port and/or interface with which the address is associated. In one example, switch 210-1 may determine that the address is associated with one or more ports (e.g., port 1 and/or port 2) and/or interfaces (e.g., I/F 225-1 and/or I/F 225-2) associated with aggregate I/F 235 (e.g., aggregate I/F 235-1). Switch 210-1 may transmit the traffic, to virtual node 222, via provide the one or more ports and/or I/Fs 225 associated with aggregate I/F 235.

During normal operations, node 220-1 (e.g., as backup node 220-1) may receive the traffic from link 230-1 and via I/F 225-1 and may drop the traffic based on a determination that link 230-1 and/or I/F 225-1 are in an inactive state (e.g., an attached state). Additionally, or alternatively, node 220-2 (e.g., as active node 220-2) may receive the traffic from link 230-2 and via I/F 225-2 and may process the traffic based on a determination that link 230-2 and/or I/F 225-2 are in an active state (e.g., a collecting and/or distributing state). Node 220-2 may transmit the traffic to switch 210-2 over link 230-4 and via I/F 225-4 to switch 210-2. Switch 210-2 may receive the traffic and may forward the traffic to client 205-2.

Node 220-2 may, however, determine that a failover operation is to be performed and may provide a notification (e.g., based on LACP and/or some other control protocol) to node 220-1 indicating that node 220-2 is changing to an inactive state (e.g., when node 220-2 experiences a failure, a degradation in performance, etc.) and/or that link 230-1 is changing to an inactive state (e.g., such as when link 230-1 is not longer available to transport traffic). Node 220-2 may also, or alternatively, cause link 230-1 and/or I/F 225-1 to change from an active state to an active state. Node 220-1 may receive the notification and may cause link 230-2 and/or I/F 225-2 to change from an inactive state to an active state. Thus, when the traffic is received, from switch 210-1, via the aggregate I/F 235, node 220-2 may drop the traffic based on link 230-1 and/or I/F 225-1 changing to the inactive state and node 220-1 may process the traffic based on link 230-2 and/or I/F 225-2 changing to the active state.

Node 220-1 may transmit the traffic to switch 210-2 over link 230-3 and via I/F 225-2 to switch 210-2. Switch 210-2 may receive the traffic, via another aggregate I/F 235 (e.g., aggregate I/F 235-2) and may transmit the traffic client 205-2. Additionally, or alternatively, when node 220-2 remains active, but link 230-1 has been changed to an inactive state, node 220-1 may transmit the traffic to node 220-2, which may cause node 220-2 to transmit the traffic to switch 210-2 via link 230-4 and/or I/F 225-4. Switch 210-2 may receive the traffic and may forward the traffic to client 205-2.

The failover operation may be performed without node 220-2, acting as a layer two node 220, toggling link 230-2 (e.g., from an active state, to an inactive state, and back to the active state) and/or causing switch 210-1 to purge address tables, etc. Additionally, or alternatively, the failover operation may be performed without node 220-2, acting as a layer three node 220, providing a notification, to switch 210-1, indicating that the failover operation is occurring and/or that link 230-1 is changing to the inactive state, and/or without causing switch 210-1 to purge address tables, etc.

Figure 7:
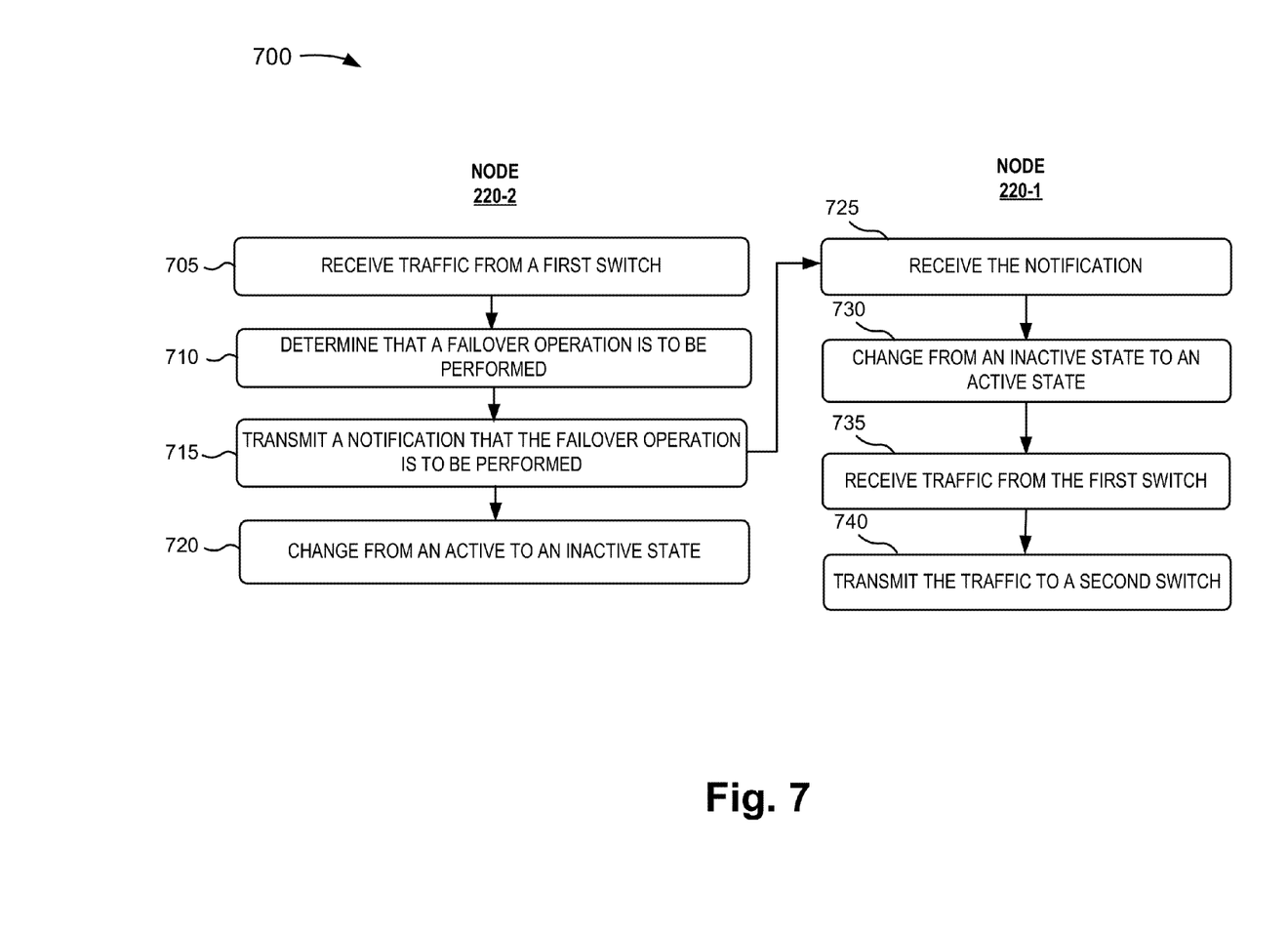
FIG. 7 is a flow chart of another example process for performing a failover operation by a node.

FIG. 7 is a flow chart of another example process 700 for performing a failover operation by node 220. In one example implementation, process 700 may be performed by node 220. Alternatively, or additionally, some or all of process 700 may be performed by a device or collection of devices separate from, or in combination with node 220. Assume, in the description below, that node 220-1 is in an inactive state and, thus, represents a backup node 220 that is not available to process and/or forward traffic received from switch 210-1. Assume also that node 220-2 is in an active state and, thus, represents an active node 220 that is available to process and/or forward traffic that is received from switch 210-1.

As shown in FIG. 7, process 700 may include receiving traffic from a first switch (block 705). For example, node 220-2 may receive traffic from switch 210-1 that is destined for client 205-2. In this example, switch 220-1 may receive traffic from client 205-1 and switch 220-1 may identify an address associated with the traffic. Switch 210-1 may access an address table (e.g., data structure 500 of FIG. 5) to identify via which port, I/F 225 and/or aggregate I/F 235 the traffic is to be transmitted. Switch 210-1 may transmit the traffic to node 220-1 and node 220-2 via ports (e.g., port 1 and/or port 2 associated with switch 210-1) associated with aggregate I/F 235-1 with which the address is associated. Node 220-2 and/or node 220-1 may receive the traffic via links 230-2 and 230-1, respectively. During normal operation, node 220-2 may process the traffic and may provide the traffic to switch 210-2 to be forwarded to client 205-1. Node 220-1 may determine that link 230-1 and/or I/F 235-1 is in an inactive state (e.g., an attached state) and may drop the traffic.

As also shown in FIG. 7, process 700 may include and determining that a failover operation is to be performed (block 710) and transmitting a notification indicating that the failover operation is to be performed (block 715). For example, node 220-2 may determine that a failover operation is to be performed and may provide a notification (e.g., based on LACP and/or some other control protocol) to node 220-1 indicating that node 220-2 is changing from an active state to an inactive state and/or that link 230-2 is changing from an active state (e.g., a collecting and/or distributing state, etc.) to an inactive state (e.g. an attached state, etc.). Node 220-2 may determine that the failover operation is to be performed when node 220-2 experiences a failure, detects a degradation in performance, and/or determines that link 230-2 is no longer available to transport the traffic.

As further shown in FIG. 7, process 700 may include changing from the active state to the inactive state (block 720). For example, node 220-2 may change from an active state to an inactive state, which may render node 220-2 unavailable to process and/or transmit traffic. Additionally, or alternatively, node 220-2 may cause I/F 225-2 and/or link 230-2 to change from the active state to the inactive state. Thus, when node 220-2 receives traffic from switch 210-1, node 220-2 may not process and/or forward the traffic to switch 210-2. Additionally, or alternatively, node 220-2 may drop the traffic received from switch 210-1.

Node 220-2 may perform the failover operation (e.g., provide the notification, changing states, etc.) without toggling link 230-2 (e.g., from the active state, to the inactive state, and back to the active state), which may enable switch 210-1 to continue to process and/or transmit traffic without purging the address table, replicating packets, rebuilding the address table, etc. Node 220-2 may also, or alternatively, perform the failover operation without providing a notification to switch 210-1 indicating that the failover operation is to be performed, which may enable switch 210-1 to continue to process and/or transmit traffic without purging the address table, replicating packets, rebuilding the address table, etc.

As also shown in FIG. 7, process 700 may include receiving the notification (block 725) and changing from an inactive state to an active state (block 730). For example, node 220-1 may receive, from node 220-2, the notification indicating that node 220-2 is changing to the inactive state and/or that I/F 235-2 and/or link 230-2 is changing to the inactive state. Node 220-1 may, based on receiving the notification, change from an inactive state to an active state. The active state may enable node 220-1 to process and/or transmit traffic. Additionally, or alternatively, node 220-1 may cause link 230-1 and/or I/F 225-1 to change from an inactive state (e.g., an attached state, etc.) to an active state (e.g., a collecting and/or distributing state, etc.). In one example, node 220-1 may change from an inactive state to an active state when node 220-2 becomes unresponsive, such as when notifications, based on a control protocol (e.g., LACP and/or some other control protocol), are no longer received from node 220-2.

As further shown in FIG. 7, process 700 may include receiving traffic from the first switch (block 735) and transmitting the traffic to a second switch (block 740). For example, node 220-1 may receive the traffic from switch 210-1 and may process the traffic based on the change of state associated with node 220-1, I/F 225-1, and/or link 230-1. Node 220-1 may process the traffic and may provide the traffic to switch 210-2 to be forwarded to client 205-1.

The aggregate interface may enable node 220-2 and node 220-1 to receive, from switch 210-1, the traffic. Node 220-2 may, as described above with respect to block 705, provide the traffic to switch 210-2 to be forwarded to client 205-2 when node 220-2 is in the active state. When the failover operation occurs, node 220-1 may change from the inactive state to the active state, which may enable node 220-1 to provide the traffic to switch 210-2 to be forwarded to client 205-2. Thus, client 205-2 may receive the traffic, from switch 210-2, without detecting a loss of traffic, a disruption of service, etc. when the failover operation is performed between node 220-2 and node 220-1.

Systems and/or methods, described herein, may enable a security system to perform a failover operation without causing a disruption of network services and/or a loss of data. The security system may perform the failover operation when a first node and/or a first link, associated with the security system, degrades in performance or becomes unavailable to transport traffic. The security system may use an aggregate interface to cause the traffic, previously being transported via the first node and/or the first link, to be transported via a second node and/or a second link associated with the security system. The aggregate interface may enable the security system to perform the failover operation without changing network topology (e.g., purging address tables, rebuilding address tables, etc.), which may enable the traffic to continue to be transported by the security system without a service disruption or a loss of data.

The foregoing description of implementations provides illustration and description, but is not intended to be exhaustive or to limit the implementations to the precise form disclosed. Modifications and variations are possible in light of the above implementations or may be acquired from practice of the implementations.

For example, while series of blocks have been described with regard to FIGS. 4, 6, and 7 the order of the blocks may be modified in other implementations. Further, non-dependent blocks may be performed in parallel.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device, comprising:
   a processor to:
   replicate a first packet to obtain a first replicate of the first packet and a second replicate of the first packet,
   transmit the first replicate of the first packet to a first node via a first port and the second replicate of the first packet to a second node via a second port,
   receive from the first node, and via the first port, a second packet based on the first node receiving the first replicate of the first packet,
   the second packet including information identifying an address,
   the second replicate of the first packet being dropped by the second node,
   associate the address with an aggregate interface associated with the first port and with the second port,
   receive traffic that is destined for a client device,
   the traffic being associated with the address,
   determine that the address is associated with the aggregate interface,
   the first node being in a first state,
   the first state indicating that the first node is available to forward the traffic to the client device, and
   the second node being in a second state,
   the second state indicating that the second node is not available to forward the traffic to the client device, and
   transmit the traffic to the first node and to the second node, via the aggregate interface, based on the address being associated with the aggregate interface,
   the first node forwarding the traffic to the client device based on the first node being in the first state, and
   the second node not forwarding the traffic to the client device based on the second node being in the second state.

2. The device of claim 1, where the processor is further to:
   preclude the address from being purged from a memory, associated with the device, when the first node changes from the first state to the second state.

3. The device of claim 1, where the processor is further to:
   receive a request to create the aggregate interface, and
   associate the first port with the second port to create the aggregate interface.

4. The device of claim 1, where the processor is further to:
   associate the first state with the first node based on receiving the second packet from the first node, and
   associate the second state with the second node.

5. The device of claim 1, where, when receiving the second packet, the processor is further to at least one of:
   associate a third state with a first link that connects the first node to the first port,
   the third state indicating that the first link is available to receive or process the traffic, or
   associate a fourth state with a second link that connects the second node to the second port,
   the fourth state indicating that the second link is not available to receive or process the traffic.

6. The device of claim 1, where the address corresponds to at least one of:

a first address associated with the first node when the first node or the second node operate based on a network layer protocol,
the network layer protocol corresponding to an Open Systems Interconnection (OSI) model of the International Organization for Standardization, or
a second address associated with the client device when the first node or the second node operate based on a data link layer protocol,
the data link layer protocol corresponding to the OSI model.

7. The device of claim 1, where the processor is further to:
associate the first node with the second node to create a virtual node, and associate the aggregate interface with the virtual node to allow the traffic to be transmitted to the virtual node based on the address.

8. A method comprising:
replicating, by a network device, a first packet to obtain a first replicate of the first packet and a second replicate of the first packet;
transmitting, by the network device, the first replicate of the first packet to a first node via a first port and the second replicate of the first packet to a second node via a second port;
receiving, by the network device and via the first port, a second packet from the first node,
the second packet being received based on the first node receiving the first replicate of the first packet,
the second node dropping the second replicate of the first packet, and
the second packet including information identifying an address;
associating, by the network device, the address with an aggregate interface,
the aggregate interface being associated with the first port and with the second port;
receiving, by the network device, traffic that is destined for a client device,
the traffic being associated with the address;
determining, by the network device, that the address is associated with the aggregate interface; and
transmitting, by the network device, the traffic to the first node and to the second node, via the aggregate interface, based on the address being associated with the aggregate interface,
the first node forwarding the traffic to the client device based on the first node being in a first state, and
the second node dropping the traffic based on the second node being in a second state.

9. The method of claim 8, further comprising:
precluding the address from being purged from a memory, associated with the device, when the first node changes from the first state to the second state.

10. The method of claim 8, further comprising:
receiving a request to create the aggregate interface; and
associating the first port with the second port to create the aggregate interface.

11. The method of claim 8, where the second node does not provide a response, to the network device, based on receiving the second replicate of the first packet.

12. The method of claim 8, where the receiving the second packet includes at least one of:
associating the first state with the first node,
associating the second state with the second node,
associating a third state with a first link that connects the first node to the first port, the third state indicating that the first link is available to receive or process the traffic, or associating a fourth state with a second link that connects the second node to the second port, the fourth state indicating that the second link is not available to receive or process the traffic.

13. The method of claim 8, where the address corresponds to at least one of:

a first address associated with the first node when the first node or the second node operate based on a network layer protocol, the network layer protocol corresponding to an Open Systems Interconnection (OSI) model of the International Organization for Standardization, or a second address associated with the client device when the first node or the second node operate based on a data link layer protocol, the data link layer protocol corresponding to the OSI model.

14. The method of claim 8, further comprising:

associating the first node with the second node to create a virtual node; and associating the aggregate interface with the virtual node to allow the traffic to be transmitted to the virtual node based on the address.

15. A non-transitory computer-readable medium storing instructions, the instructions comprising:

one or more instructions that, when executed by one or more processors of a device, cause the one or more processors to:

replicate a first packet to obtain a first replicate of the first packet and a second replicate of the first packet;

transmit the first replicate of the first packet to a first node via a first port and the second replicate of the first packet to a second node via a second port;

receive from the first node, and via the first port, a second packet based on the first node receiving the first replicate of the first packet, the second packet including information identifying an address associated with a client device, the second node dropping the second replicate of the first packet;

associate the address with an aggregate interface associated with the first port and with the second port;

receive traffic that is destined for the client device;

determine that the address is associated with the aggregate interface; and transmit the traffic to the first node and to the second node, via the aggregate interface, based on the address being associated with the aggregate interface, the first node forwarding the traffic to the client device based on the first node being in an active state, and the traffic not being forwarded by the second node based on the second node being in an inactive state.

16. The non-transitory computer-readable medium of claim 15, where the instructions further comprise:

one or more instructions that, when executed by the one or more processors, cause the one or more processors to:

preclude the address from being purged from a memory, associated with the device, when the first node changes from the active state to the inactive state.

17. The non-transitory computer-readable medium of claim 15, where the instructions further comprise:

one or more instructions that, when executed by the one or more processors, cause the one or more processors to:

receive a request to create the aggregate interface; and associate the first port with the second port to create the aggregate interface based on the request.

18. The non-transitory computer-readable medium of claim 15, where the second node provides no response, to the device, based on receiving the second replicate of the first packet.

19. The non-transitory computer-readable medium of claim 15, where the one or more instructions to receive the second packet include at least one of:

one or more instructions that, when executed by the one or more processors, cause the one or more processors to:

determine that the first node is in the active state based on receiving the second packet from the first node.

20. The non-transitory computer-readable medium of claim 15, where the address corresponds to an address associated with the client device when the first node and the second node correspond to layer two nodes, and where the address corresponds to an address associated with the first node and the second node when the first node and the second node correspond to layer three nodes.

21. The non-transitory computer-readable medium of claim 15, where the instructions further comprise:

one or more instructions that, when executed by the one or more processors, cause the one or more processors to:

associate the first node with the second node to create a virtual node; and associate the aggregate interface with the virtual node to allow the traffic to be transmitted to the virtual node based on the address.

* * * * *